July 24, 1923.
H. H. WALLS
ARTIFICIAL BAIT
Filed Dec. 23, 1919
1,462,949
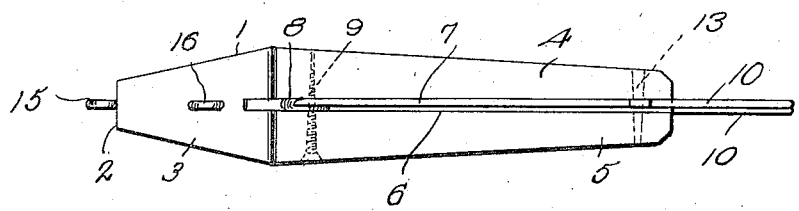
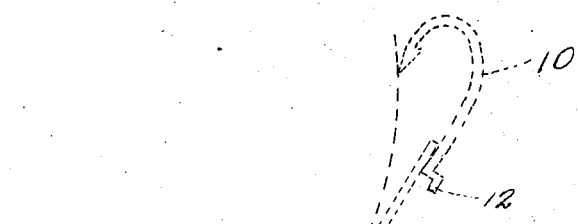
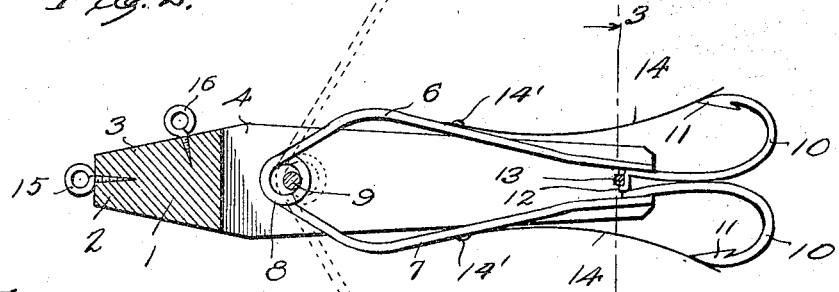
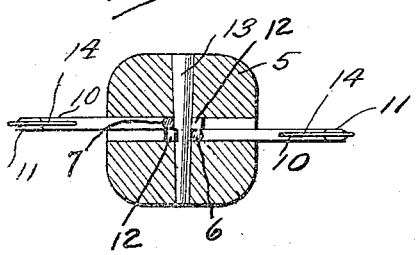
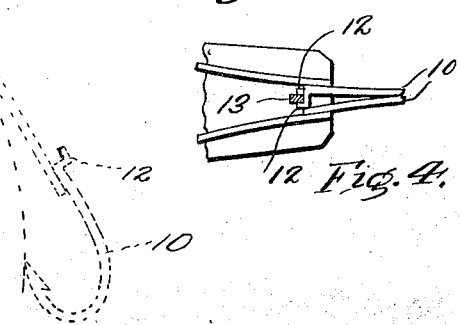
Witnesses
I. P. McCathian
F. D. O'Connell
Inventor
Harold H. Walls
By Richard B. Owen
Attorney Patented July 24, 1923.

1,462,949

UNITED STATES PATENT OFFICE.

HAROLD H. WALLS, OF JACKSON, MICHIGAN.

ARTIFICIAL BAIT.

Application filed December 23, 1919. Serial No. 346,868.

*To all whom it may concern:*

Be it known that I, HAROLD H. WALLS, a citizen of the United States, residing at Jackson, in the county of Jackson and State of Michigan, have invented certain new and useful Improvements in Artificial Bait, of which the following is a specification.

My invention has relation to fishing decoys and has for its purpose the provision of a device of this character which is automatic in operation and which is capable of preventing the escape of any fish setting off the decoy regardless of whether or not the fishing line is broken.

A further object is to provide a device of the above character which is capable of being efficiently employed in either surface fishing or deep fishing and which is spring actuated in its operation.

With these and other objects my invention consists in the features of construction, combination and arrangement of parts, as are hereinafter more fully described and claimed, reference being had to the accompanying drawings in which:

Figure 1 is a top plan view of the decoy.

Figure 2 is a longitudinal vertical section through the same; the released position of the hook arms being indicated by the dotted lines.

Figure 3 is a section taken on the line 3—3 of Figure 2.

Figure 4 is an enlarged detailed view disclosing the manner in which the catches engage the catch bar of the decoy body.

The body of the decoy may be made of any desired material but preferably of Canadian silver spruce or similar light and tough wood and is provided with a solid head 1 tapering toward its outer nose 2 and is provided on top of the head with a flat surface 3.

The body tapers rearwardly of the head and is slit longitudinally to provide spaced tail members 4 and 5 respectively. Movably disposed within the space between the tail members 4 and 5 is a spring bent to provide arms 6 and 7 extending from a coiled portion 8, as shown to advantage in Figure 2 of the drawings. A screw 9 passes from the tail member 5 to the member 4 and extends through the coiled portion 8, thus providing a bearing for the latter of considerably smaller diameter so as to permit of an appreciable amount of movement of the coil with respect to the screw for a purpose to be hereinafter more fully set forth and explained.

Fastened to the end of each of the spring arms 6 and 7 are hook members 10 curved outwardly from each other and rearwardly to extend above the sides of the decoy body, hooks 11 being provided on each member for gripping and retaining thereon the fish attempting to swallow the decoy. The lower end 12 of each member 10 is bent outwardly from the adjacent spring arm 6 or 7, as the case may be, to provide catch means for engagement over a catch bar 13, passing from the tail member 4 across to the member 5 as illustrated in Fig. 1.

To prevent the hooks 11 from catching onto weeds or roots, a very fine spring wire 14 is carried by each of the arms 6 and 7 and secured thereto by any suitable fastening means 14' so that the free end extends over the point of the hooks as shown in the drawings. The nose 2 of the decoy is provided with a screw eye 15 to which a fishing line is to be ordinarily attached when the decoy is employed merely for surface fishing. However, when it is desirable that the decoy should sink some depth, the line should be attached to the screw eye 16, which as will be noted, is fastened to the upper part of the head. The flat surface 3 of the head tends to facilitate sinking of the decoy body when the line is attached to the screw eye as indicated.

In operation, the decoy is submerged, after the spring hooks 10 have been set. In setting the device, the spring arms 6 and 7 which normally tend to expand and separate the members 10 are forced inwardly between the tail members 4 and 5 until the catches 12 are effectively engaged over the catch bar 13, the relative diameters of the screw 9 and coil 8 being such as to readily permit the spring arms to be adjusted forwardly sufficient to permit the catches to be engaged over the bar as described. Upon an attempt to seize the decoy, the slightest pull is sufficient to disengage the catches 12 from the catch bar, and consequently to release the spring arms to their fullest extent. Upon such movement of the spring arms the members 10 are forcibly separated tearing open the mouth of the fish and permitting water to enter in such quantity as to foul the gills, causing suffocation of the fish and the subsequent floating of the captured fish on the water.

It is thus evident that having been once caught by the decoy it is impossible to escape and whether or not the line should be broken, escape is cut off.

Having thus described my invention, what I claim as new and desire to secure by Letters Patent is:—

1. A fish decoy comprising a decoy body, slotted longitudinally of one end to provide spaced tail-members, a catch bar connecting the members adjacent the outer end of the slot, a screw connecting the members adjacent the inner end of the slot, a spring member having spring arms flexed to normally spring outwardly from the slot and a coil connecting the arms at one end, said coil being loosely engaged with the said screw to permit adjustment of the said member longitudinally of the slot, a hook at the end of each arm, and a catch on each hook for engaging the catch bar to hold the arms under tension, the catch members overlapping each other when engaging the catch bar, said catches disengaging the bar when the spring member is pulled outwardly and longitudinally of the slot.

2. A fish decoy comprising a decoy body having a single catch bar, a spring member having limited sliding movement longitudinally of the said body and flexed to provide oppositely disposed hook bearing arms, and a hook member attached to each arm adjacent its inner end, said hook member having its inner end offset to provide a catch member for engaging over the said catch bar, when the said longitudinal adjustable member is moved inwardly of the bar, said arms being tensioned to disengage the bar and spring laterally from the body when the spring member is moved outwardly therefrom.

In testimony whereof I affix my signature in presence of two witnesses.

HAROLD H. WALLS.

Witnesses:
  Mrs. HAROLD H. WALLS,
  GERTRUDE BOLAND.